United States Patent
Aharon et al.

(10) Patent No.: US 8,165,215 B2
(45) Date of Patent: Apr. 24, 2012

(54) SYSTEM AND METHOD FOR DESIGNING OF DICTIONARIES FOR SPARSE REPRESENTATION

(75) Inventors: Michal Aharon, Haifa (IL); Michael Elad, Kiryat Tivon (IL); Alfred Bruckstein, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 1206 days.

(21) Appl. No.: 11/910,568

(22) PCT Filed: Apr. 4, 2006

(86) PCT No.: PCT/IL2006/000423
§ 371 (c)(1),
(2), (4) Date: Oct. 3, 2007

(87) PCT Pub. No.: WO2006/106508
PCT Pub. Date: Oct. 12, 2006

(65) Prior Publication Data
US 2008/0170623 A1    Jul. 17, 2008

Related U.S. Application Data

(60) Provisional application No. 60/668,277, filed on Apr. 4, 2005.

(51) Int. Cl.
*H04N 11/02* (2006.01)
(52) U.S. Cl. ................................. 375/240.22
(58) Field of Classification Search ............ None
See application file for complete search history.

(56) References Cited

U.S. PATENT DOCUMENTS

| 6,151,414 | A  | * | 11/2000 | Lee et al. ............... 382/253 |
| 7,003,039 | B2 |   | 2/2006  | Zakhor et al. |
| 7,079,986 | B2 | * | 7/2006  | Sieracki ............... 702/189 |
| 7,164,494 | B1 | * | 1/2007  | Dalton ................. 358/1.9 |
| 2003/0058943 | A1 | * | 3/2003 | Zakhor et al. ........ 375/240.12 |
| 2009/0103602 | A1 | * | 4/2009 | Xiong et al. ......... 375/240.01 |

FOREIGN PATENT DOCUMENTS
WO    2004/086302  A1    10/2004

OTHER PUBLICATIONS

Gribonval, R., "Fast matching pursuit with a multiscale dictionary of Gaussian chirps", May 2001, IEEE Transsactions on Signal Processing, vol. 49 Issue 5, p. 994-1001.*

* cited by examiner

*Primary Examiner* — Chirag Shah
*Assistant Examiner* — Salvadore E Rivas
(74) *Attorney, Agent, or Firm* — Browdy and Neimark, PLLC (57) ABSTRACT

A signal processing system adapted for sparse representation of signals is provided, comprising: (i) one or more training signals; (ii) a dictionary containing signal-atoms; (iii) a representation of each training signal using a linear combination of said dictionary's signal-atoms; (iv) means for updating the representation of the training signal; (v) means for updating the dictionary one group of atoms at a time, wherein each atom update may include all representations referring to said updated atom; and (vi) means for iterating (iv) and (v) until a stopping rule is fulfilled. The system uses the K-SVD algorithm for designing dictionaries for sparse representation of signals.

17 Claims, 6 Drawing Sheets

---

Task: Find the best dictionary to represent the data samples $\{y_i\}_{i=1}^N$ as sparse compositions, by solving $$\min_{D,X}\{\|Y - DX\|_F^2\} \text{ subject to } \forall i, \|x_i\|_0 \leq T_0.$$

Initialization: Set the dictionary matrix $D^{(0)} \in \mathbb{R}^{n \times K}$ with $\ell^2$ normalized columns. Set $J = 1$.

Repeat until convergence (stopping rule):
- *Sparse Coding Stage*: Use any pursuit algorithm to compute the representation vectors $x_i$ for each example $y_i$, by approximating the solution of $i = 1, 2, \ldots, N, \quad \min_{x_i}\{\|y_i - Dx_i\|_2^2\}$ subject to $\|x_k\|_0 \leq T_0$.

- *Codebook Update Stage*: For each column $k = 1, 2, \ldots, K$ in $D^{(J-1)}$, update it by
  - Define the group of examples that use this atom, $\omega_k = \{i | 1 \leq i \leq N, x_T^k(i) \neq 0\}$.
  - Compute the overall representation error matrix, $E_k$, by $$E_k = Y - \sum_{j \neq k} d_j x_T^j.$$

- Restrict $E_k$ by choosing only the columns corresponding to $\omega_k$, and obtain $E_k^R$.
  - Apply SVD decomposition $E_k^R = U\Delta V^T$. Choose the updated dictionary column $\tilde{d}_k$ to be the first column of $U$. Update the coefficient vector $x_R^k$ to be the first column of $V$ multiplied by $\Delta(1,1)$.
- Set $J = J + 1$.

Task: Find the best dictionary to represent the data samples $\{y_i\}_{i=1}^{N}$ as sparse compositions, by solving $$\min_{D,X} \{\|Y - DX\|_F^2\} \quad \text{subject to} \quad \forall i, \ \|x_i\|_0 \leq T_0.$$

Initialization : Set the dictionary matrix $D^{(0)} \in \mathbb{R}^{n \times K}$ with $\ell^2$ normalized columns. Set $J = 1$.

Repeat until convergence (stopping rule):

- *Sparse Coding Stage*: Use any pursuit algorithm to compute the representation vectors $x_i$ for each example $y_i$, by approximating the solution of $$i = 1, 2, \ldots, N, \quad \min_{x_i} \{\|y_i - Dx_i\|_2^2\} \quad \text{subject to} \quad \|x_k\|_0 \leq T_0.$$

- *Codebook Update Stage*: For each column $k = 1, 2, \ldots, K$ in $D^{(J-1)}$, update it by
  - Define the group of examples that use this atom, $\omega_k = \{i \mid 1 \leq i \leq N, \ x_T^k(i) \neq 0\}$.
  - Compute the overall representation error matrix, $E_k$, by $$E_k = Y - \sum_{j \neq k} d_j x_T^j.$$

- Restrict $E_k$ by choosing only the columns corresponding to $\omega_k$, and obtain $E_k^R$.
  - Apply SVD decomposition $E_k^R = U \Delta V^T$. Choose the updated dictionary column $\tilde{d}_k$ to be the first column of $U$. Update the coefficient vector $x_R^k$ to be the first column of $V$ multiplied by $\Delta(1,1)$.
- Set $J = J + 1$.

K-SVD dictionary
8 bits per coefficients
PSNR =34.1564
Rate = 0.70651 BPP

Fig. 8A

Overcomplete DCT dictionary
8 bits per coefficients
PSNR =32.4021
Rate = 0.69419 BPP

Fig. 8B

Complete DCT dictionary
8 bits per coefficients
PSNR =32.3917
Rate = 0.70302 BPP

Fig. 8C

SYSTEM AND METHOD FOR DESIGNING OF DICTIONARIES FOR SPARSE REPRESENTATION

FIELD OF THE INVENTION

The present invention relates to a system and method for the sparse representation of signals. The invention is particularly relevant for applications such as compression, regularization in inverse problems, feature extraction, denoising, separation of texture and cartoon content in images, signal analysis, signal synthesis, inpainting and restoration.

BACKGROUND OF THE INVENTION

Sparse Representation of Signals

In recent years there has been a growing interest in the study of sparse representation of signals. Using an overcomplete dictionary that contains prototype signal-atoms, signals are described as sparse linear combinations of these atoms. Applications that use sparse representation are many and include compression, regularization in inverse problems, feature extraction, and more. Recent activity in this field concentrated mainly on the study of pursuit algorithms that decompose signals with respect to a given dictionary. Designing dictionaries to better fit the above model can be done by either selecting one from a pre-specified set of linear transforms, or by adapting the dictionary to a set of training signals. Both these techniques have been considered in recent years, but this topic is largely still open.

Using an overcomplete dictionary matrix $D \in \mathbb{R}^{n \times K}$ that contains K prototype signal-atoms for columns, $\{d_j\}_{j=1}^{K}$, it is assumed that a signal $y \in \mathbb{R}^n$ can be represented as a sparse linear combination of these atoms. The representation of y may either be exact $y=Dx$, or approximate, $y \approx Dx$, satisfying $|y-Dx'|_p \leq \epsilon$. The vector $x \in \mathbb{R}^K$ displays the representation coefficients of the signal y. In approximation methods, typical norms used for measuring the deviation are the $l^p$-norms for p=1, 2 and $\infty$.

If n<K and D is a full-rank matrix, an infinite number of solutions are available for the representation problem, hence constraints on the solution must be set. The solution with the fewest number of nonzero coefficients is certainly an appealing representation. This, sparsest representation, is the solution of either $$(P_0) \min_x \|x\|_0 \text{ subject to } y = Dx, \quad (1)$$

or $$(P_{0,\epsilon}) \min_x \|x\|_0 \text{ subject to } \|y - Dx\|_2 \leq \epsilon, \quad (2)$$

where $\|\cdot\|_0$ is the $l^0$ norm, counting the non zero entries of a vector.

Applications that can benefit from the sparsity and overcompleteness concepts (together or separately) include compression, regularization in inverse problems, feature extraction, and more. Indeed, the success of the JPEG2000 coding standard can be attributed to the sparsity of the wavelet coefficients of natural images. In denoising (removal of noise from noisy data so to obtain the unknown or original signal), wavelet methods and shift-invariant variations that exploit overcomplete representation, are among the most effective known algorithms for this task. Sparsity and overcompleteness have been successfully used for dynamic range compression in images, separation of texture and cartoon content in images, inpainting (changing an image so that the change is not noticeable by an observer) and restoration, and more.

In order to use overcomplete and sparse representations in applications, one needs to fix a dictionary D, and then find efficient ways to solve (1) or (2). Recent activity in this field has been concentrated mostly on the study of so called pursuit algorithms that represent signals with respect to a known dictionary, and approximate the solutions of (1) and (2). Exact determination of sparsest representations proves to be an NP-hard problem. Thus, approximate solutions are considered instead, and several efficient pursuit algorithms have been proposed in the last decade. The simplest ones are the Matching Pursuit (MP) and the Orthogonal Matching Pursuit (OMP) algorithms. Both are greedy algorithms that select the dictionary atoms sequentially. These methods are very simple, involving the computation of inner products between the signal and dictionary columns' and possibly deploying some least squares solvers. Both (1) and (2) are easily addressed by changing the stopping rule of the algorithm.

A second well known pursuit approach is the Basis Pursuit (BP). It suggests a convexisation of the problems posed in (1) and (2), by replacing the $l^0$-norm with an $l^1$-norm. The Focal Under-determined System Solver (FOCUSS) is very similar, using the $l^p$-norm with $p \leq 1$, as a replacement to the $l^0$-norm. Here, for p<1 the similarity to the true sparsity measure is better, but the overall problem becomes non-convex, giving rise to local minima that may divert the optimization. Lagrange multipliers are used to convert the constraint into a penalty term, and an iterative method is derived based on the idea of iterated reweighed least-squares that handles the $l^p$-norm as an $l^2$ weighted one.

Both the BP and FOCUSS can be motivated based on Maximum A Posteriori (MAP) estimation and indeed several works used this reasoning directly. The MAP can be used to estimate the coefficients as random variables by maximizing the posterior $P(x|y,D) \alpha P(y|D,x)P(x)$. The prior distribution on the coefficient vector x is assumed to be a super-Gaussian Independent Identically-Distributed (iid) distribution that favors sparsity. For the Laplace distribution this approach is equivalent to BP.

Extensive study of these algorithms in recent years has established that if the sought solution, x, is sparse enough, these techniques recover it well in the exact case. Further work considered the approximated versions and has shown stability in recovery of x. The recent front of activity revisits those questions within a probabilistic setting, obtaining more realistic assessments on pursuit algorithms performance and success. The properties of the dictionary D set the limits that may be assumed on the sparsity that consequently ensure successful approximation. Interestingly, in all the works mentioned so far, there is a preliminary assumption that the dictionary is known and fixed. There is a great need to address the issue of designing the proper dictionary in order to better fit the sparsity model imposed.

The Choice of the Dictionary

An overcomplete dictionary D that leads to sparse representations can either be chosen as a pre-specified set of functions, or designed by adapting its content to fit a given set of signal examples.

Choosing a pre-specified transform matrix is appealing because it is simpler. Also, in many cases it leads to simple and fast algorithms for the evaluation of the sparse representation. This is indeed the case for overcomplete wavelets, curvelets, contourlets, steerable wavelet filters, short-time-Fourier transforms, and more. Preference is typically given to tight frames that can easily be pseudo-inverted. The success of such dictionaries in applications depends on how suitable they are to sparsely describe the signals in question. Multi-scale analysis with oriented basis functions and a shift-invariant property are guidelines in such constructions.

There is need to develop a different route for designing dictionaries D based on learning, and find the dictionary D that yields sparse representations for the training signals. Such dictionaries have the potential to outperform commonly used pre-determined dictionaries. With ever-growing computational capabilities, computational cost may become secondary in importance to the improved performance achievable by methods which adapt dictionaries for special classes of signals.

Sparse coding is the process of computing the representation coefficients, x, based on the given signal y and the dictionary D. This process, commonly referred to as "atom decomposition", requires solving (1) or (2), and this is typically done by a "pursuit algorithm" that finds an approximate solution. Three popular pursuit algorithms are the Orthogonal Matching Pursuit (OMP), Basis Pursuit (BP) and the Focal Under-determined System Solver (FOCUSS).

Orthogonal Matching Pursuit is a greedy step-wise regression algorithm. At each stage this method selects the dictionary element having the maximal projection onto the residual signal. After each selection, the representation coefficients with regarding to the so far chosen atoms are found via least-squares. Formally, given a signal $y \in \mathbb{R}^n$, and a dictionary D with K $l^2$-normalized columns $\{d_k\}_{k=1}^{K}$, one starts by setting $r_0 = y$, $k=1$, and performing the following steps:
1) Select the index of the next dictionary element $i_k = \text{argmax}_w |\langle r_{k-1}, d_w \rangle|$;
2) Update the current approximation $y_k = \text{argmin}_{y_k} \|y - y_k\|_2^2$ such that $y_k \in \text{span}\{d_{i_1}, d_{i_2}, \ldots, d_{i_k}\}$; and
3) Update the residual $r_k = y - y_k$.

The algorithm can be stopped after a predetermined number of steps, hence after having selected a fixed number of atoms. Alternatively, the stopping rule can be based on norm of the residual, or on the maximal inner product computed in the next atom selection stage.

OMP is an appealing and very simple to implement algorithm. Unlike other methods, it can be easily programmed to supply a representation with an a priori fixed number of non-zero entries—a desired outcome in the training of dictionaries. There are several variants of the OMP that suggest (i) skipping the least-squares and using inner product itself as a coefficient, or (ii) applying least-squares per every candidate atom, rather than just using inner-products at the selection stage, or (iii) doing faster and less precise search, where instead of searching for the maximal inner product, a nearly maximal one is selected, thereby speeding up the search.

Theoretic study has shown that the OMP solution is also the sparsest available one (solving (1)) if some conditions on the dictionary and on the exact solution prevail. More recent work has shown that the above is also true for the approximation version (2). These results and some later ones that apply to the basis pursuit and FOCUSS involve a key feature of the dictionary D called the mutual incoherence and defined as:

$$\mu = \max_{i \neq j} |d_i^T d_j|. \tag{3}$$

This measure quantifies how similar two columns of the dictionary can be. Given $\mu$, if the sparse representation to be found has fewer than $\mathcal{O}(1/\mu)$ non-zeros, the OMP and its variants are guaranteed to succeed in recovering it.

Basis Pursuit (BP) algorithm proposes the replacement of the $l^0$-norm in (1) and (2) with an $l^1$-norm. Hence solutions of:

$$(P_1) \min_x \|x\|_1 \text{ subject to } y = Dx, \tag{4}$$

in the exact representation case, and $$(P_{1,\epsilon}) \min_x \|x\|_1 \text{ subject to } \|y - Dx\| \leq \epsilon, \tag{5}$$

in the approximate one, lead to the BP representations. Solution of (4) amounts to linear programming, and thus there exists efficient solvers for such problems.

Recent research addressed the connection between the $(P_0)$ and $(P_1)$. The essential claims are quite similar to the ones of OMP, namely, if the signal representation to be found has fewer than $\mathcal{O}(1/\mu)$ non-zeros, the BP is guaranteed to succeed in recovering it. Similar results exist for the approximated case, proving that recovered representations are very close to the original sparse one in case of high sparsity.

Focal Under-determined System Solver (FOCUSS) is an approximating algorithm for finding the solutions of either (1) or (2), by replacing the $l^0$-norm with an $l^p$ one for $p \leq 1$.

For the exact case problem, $(P_0)$, this method requires solving $$(P_p) \min_x \|x\|_p \text{ subject to } y = Dx. \tag{6}$$

The use of a Lagrange multiplier vector $\lambda \in \mathbb{R}^n$ here yields the Lagrangian function $$\mathcal{L}(x,\lambda) = \|x\|_p + \lambda^T(y - Dx). \tag{7}$$

Hence necessary conditions for a pair x, $\lambda$ to be a solution of 6 are $$\nabla_x \mathcal{L}(x,\lambda) = p\pi(x)x - D^T\lambda = 0 \text{ and } \nabla_\lambda \mathcal{L}(x,\lambda) = Dx - y = 0, \tag{8}$$

where $\pi(x)$ is defined to be a diagonal matrix with $|x_i|^{p-2}$ as its $(i,i)^{th}$ entry. The split of the $l^p$-norm derivative into a linear term multiplied by a weight matrix is the core of the FOCUSS method, and this follows the well-known idea of iterated reweighed least-squares. Several simple steps of algebra leads to the solution:

$$x = \pi(x)^{-1}D^T(D\pi(x)^{-1}D^T)^{-1}y. \tag{9}$$

While it is impossible to get a closed form solution for x from the above result, an iterative replacement procedure can be proposed, where the right hand side is computed based on the currently known $x_{k-1}$, and this leads to the updating process, $$x_k = \pi(x_{k-1})^{-1}D^T(D\pi(x_{k-1})^{-1}D^T)^{-1}y. \tag{10}$$

A regularization can, and should, be introduced to avoid near-zero entries in the weight matrix $\pi(x)$.

For the treatment of $(P_{0,\epsilon})$ via the $(P_{p,\epsilon})$ parallel expressions can be derived quite similarly, although in this case the determination of the Lagrange multiplier is more difficult and must be searched within the algorithm.

Recent work analyzed the $(P_p)$ problem and showed its equivalence to the $(P_0)$, under conditions similar in flavor to the sparsity conditions mentioned above. Hence, this approach too enjoys the support of some theoretical justification, like BP and OMP. However, the analysis does not say anything about local minima traps and prospects in hitting those in the FOCUSS-algorithm.

Design of Dictionaries: Prior Art

There has been some work in the field regarding the training of dictionaries based on a set of examples. Given such set $Y=\{y_i\}_{i=1}^N$, we assume that there exists a dictionary D that gave rise to the given signal examples via sparse combinations, i.e., we assume that there exists D, so that solving $(P_0)$ for each example $y_k$ gives a sparse representation $x_k$. It is in this setting that the question is raised what the proper dictionary D is.

A. Generalizing the K-Means

There is an intriguing relation between sparse representation and clustering (i.e., vector quantization). In clustering, a set of descriptive vectors $\{d_k\}_{k=1}^K$ is learned, and each sample is represented by one of those vectors (the one closest to it, usually in the $l^2$ distance measure). One can think of this as an extreme sparse representation, where only one atom is allowed in the signal decomposition, and furthermore, the coefficient multiplying it must be 1. There is a variant of the vector quantization (VQ) coding method, called Gain-Shape VQ, where this coefficient is allowed to vary. In contrast, in sparse representations relevant to the invention, each example is represented as a linear combination of several vectors $\{d_k\}_{k=1}^K$. Thus, sparse representations can be referred to as a generalization of the clustering problem.

Since the K-Means algorithm (also known as generalized Lloyd algorithm—GLA) is the most commonly used procedure for training in the vector quantization setting, it is natural to consider generalizations of this algorithm when turning to the problem of dictionary training. The K-Means process applies two steps per each iteration: (i) given $\{d_k\}_{k=1}^K$, assign the training examples to their nearest neighbor; and (ii) given that assignment, update $\{d_k\}_{k=1}^K$ to better fit the examples.

The approaches to dictionary design that have been tried so far are very much in line with the two-step process described above. The first step finds the coefficients given the dictionary—a step we shall refer to as "sparse coding". Then, the dictionary is updated assuming known and fixed coefficients. The differences between the various algorithms that have been proposed are in the method used for the calculation of coefficients, and in the procedure used for modifying the dictionary.

B. Maximum Likelihood Methods

Maximum likelihood methods use probabilistic reasoning in the construction of D. The proposed model suggests that for every example y the relation $$y=Dx+v, \quad (11)$$

holds true with a sparse representation x and Gaussian white residual vector v with variance $\sigma^2$. Given the examples $Y=\{y_i\}_{i=1}^N$ these works consider the likelihood function P(Y|D) and seek the dictionary that maximizes it. Two assumptions are required in order to proceed—the first is that the measurements are drawn independently, readily providing $$P(Y\mid D) = \prod_{i=1}^N P(y_i\mid D). \quad (12)$$

The second assumption is critical and refers to the "hidden variable" x. The ingredients of the likelihood function are computed using the relation $$P(y_i|D)=\int P(y_i,x|D)dx=\int P(y_i|x\cdot D)\cdot P(x)dx. \quad (13)$$

Returning to the initial assumption in (11), we have $$P(y_i\mid x, D) = Const\cdot\exp\left\{\frac{1}{2\sigma^2}\|Dx-y_i\|^2\right\}. \quad (14)$$

The prior distribution of the representation vector x is assumed to be such that the entries of x are zero-mean iid, with Cauchy or Laplace distributions. Assuming for example a Laplace distribution we get $$P(y_i\mid D) = \int P(y_i\mid x,D)\cdot P(x)dx \quad (15)$$
$$= Const\cdot \int \exp\left\{\frac{1}{2\sigma^2}\|Dx-y_i\|^2\right\}\cdot\exp\{\lambda\|x\|_1\}dx$$

This integration over x is difficult to evaluate, and indeed, it has been handled by replacing it with the extremal value of $P(y_i,x|D)$. The overall problem turns into $$D = \underset{D}{\operatorname{argmax}} \sum_{i=1}^N \max_{x_i}\{P(y_i,x_i\mid D)\} \quad (16)$$
$$= \underset{D}{\operatorname{argmin}} \sum_{i=1}^N \min_{x_i}\{\|Dx_i-y_i\|^2+\lambda\|x_i\|_1\}$$

This problem does not penalize the entries of D as it does for the ones of $x_i$. Thus, the solution will tend to increase the dictionary entries' values, in order to allow the coefficients to become closer to zero. This difficulty has been handled by constraining the $l^2$-norm of each basis element, so that the output variance of the coefficients is kept at an appropriate level.

An iterative method was suggested for solving (16). It includes two main steps in each iteration: (i) calculate the coefficients $x_i$ using a simple gradient descent procedure; and then (ii) update the dictionary using $$D^{(n+1)} = D^{(n)} - \eta \sum_{i=1}^N (D^{(n)}x_i - y_i)x_i^T \quad (17)$$

This idea of iterative refinement, mentioned before as a generalization of the K-Means algorithm, was later used again by other researchers, with some variations.

A different approach to handle the integration in (15) has been suggested. It consisted in approximating the posterior as a Gaussian, enabling an analytic solution of the integration. This allows an objective comparison of different image models (basis or priors). It also removes the need for the additional re-scaling that enforces the norm constraint. However, this model may be too limited in describing the true behaviors expected. This technique and closely related ones have been referred to as approximated ML techniques.

There is an interesting relation between the maximum likelihood method and the Independent Component Analysis (ICA) algorithm. The latter handles the case of a complete dictionary (the number of elements equals the dimensionality) without assuming additive noise. The maximum likelihood method is then similar to ICA in that the algorithm can be interpreted as trying to maximize the mutual information between the inputs (samples) and the outputs (the coefficients).

C. The Method of Optimal Directions

The Method of Optimal Directions (MOD), a dictionary-training algorithm, follows more closely the K-Means outline, with a sparse coding stage that uses either the OMP or FOCUSS, followed by an update of the dictionary. The main contribution of the MOD method is its simple way of updating the dictionary.

Assuming that the sparse coding for each example is known, we define the errors $e_i = y_i - Dx_i$. The overall representation mean square error is given by $$\|E\|_F^2 = \|[e_1, e_2, \ldots, e_N]\|_F^2 = \|Y - DX\|_F^2. \tag{18}$$

Here we have concatenated all the examples $y_i$ as columns of the matrix Y, and similarly gathered the representations coefficient vectors $x_i$ to build the matrix X. The notation $\|A\|_F$ stands for the Frobenius Norm, defined as $\|A\|_F = \sqrt{\Sigma_{ij} A_{ij}^2}$.

Assuming that X is fixed, we can seek an update to D such that the above error is minimized. Taking the derivative of (10) with respect to D we obtain the relation $(Y - DX)X^T = 0$, leading to $$D^{(n+1)} = YX^{(n)T} \cdot (X^{(n)}X^{(n)T})^{-1} \tag{19}$$

In updating the dictionary, the update relation given in (19) is the best that can be achieved for fixed X. The iterative steepest descent update in (17) is far slower. Interestingly, in both stages of the algorithm, the difference is in deploying a second order (Newtonian) update instead of a first-order one. Looking closely at the update relation in (17), it could be written as $$\begin{aligned} D^{(n+1)} &= D^{(n)} + \eta EX^{(n)T} \\ &= D^{(n)} + \eta(Y - D^{(n)}X^{(n)})X^{(n)T} \\ &= D^{(n)}(I - \eta X^{(n)}X^{(n)T}) + \eta YX^{(n)T}. \end{aligned} \tag{20}$$

Using infinitely many iterations of this sort, and using small enough $\eta$, this leads to a steady state outcome, which is exactly the MOD update matrix (19). Thus, while the MOD method assumes known coefficients at each iteration, and derives the best possible dictionary, the ML method by Olshausen and Field only gets closer to this best current solution, and then turns to calculate the coefficients. Note, however, that in both methods a normalization of the dictionary columns is required and done.

D. Maximum A-Posteriori Probability Approach

The same researchers that conceived the MOD method also suggested a maximum a-posteriori probability (MAP) setting for the training of dictionaries, attempting to merge the efficiency of the MOD with a natural way to take into account preferences in the recovered dictionary. This probabilistic point of view is very similar to the ML methods discussed above. However, rather than working with the likelihood function P(Y|D), the posterior P(D|Y) is used. Using Bayes rule, we have $P(D|Y) \propto P(Y|D)P(D)$, and thus we can use the likelihood expression as before, and add a prior on the dictionary as a new ingredient.

Research currents considered several priors P(D) and per each proposed an update formula for the dictionary. The efficiency of the MOD in these methods is manifested in the efficient sparse coding, which is carried out with FOCUSS. The proposed algorithms in this family deliberately avoid a direct minimization with respect to D as in MOD, due to the prohibitive n×n matrix inversion required. Instead, iterative gradient descent is used.

When no prior is chosen, the update formula is the very one used in (17). A prior that constrains D to have a unit Frobenius norm leads to the update formula $$D^{(n+1)} = D^{(n)} + \eta EX^T + \eta \cdot tr(XE^T D^{(n)}) D^{(n)}. \tag{21}$$

As can be seen, the first two terms are the same ones as in (17). The last term compensates for deviations from the constraint. This case allows different columns in D to have different norm values. As a consequence, columns with small norm values tend to be under-used, as the coefficients they need are larger and as such more penalized.

This led to the second prior choice, constraining the columns of D to have a unit $l^2$-norm. The new update equation formed is given by $$d_i^{(n+1)} = d_i^{(n)} + \eta(I - d_i^{(n)}d_i^{(n)T})E \cdot_i^T, \tag{22}$$

where $x_i^T$ is the i-th column in the matrix $X^T$.

Compared to the MOD, this line of work provides slower training algorithms.

E. Unions of Orthogonal Bases

Recent work considered a dictionary composed as a union of orthonormal bases $$D = [D_1; D_2, \ldots, D_L],$$

where $D_j \in \mathbb{R}^{n \times n}$, $j = 1, 2, \ldots, L$ are orthonormal matrices. Such a dictionary structure is quite restrictive, but its updating may potentially be made more efficient.

The coefficients of the sparse representations X can be decomposed to L pieces, each referring to a different ortho-basis. Thus, $$X = [X_1, X_2, \ldots, X_L]^T,$$

where $X_i$ is the matrix containing the coefficients of the orthonormal dictionary Di.

One of the major advantages of the union of ortho-bases is the relative simplicity of the pursuit algorithm needed for the sparse coding stage. The coefficients are found using the Block Coordinate Relaxation (BCR) algorithm. This is an appealing way to solve $(P_{1,\epsilon})$ as a sequence of simple shrinkage steps, such that at each stage $X_i$ is computed, while keeping all the other pieces of X fixed. Thus, this evaluation amounts to a simple shrinkage.

Assuming known coefficients, the proposed algorithm updates each orthonormal basis $D_j$ sequentially. The update of $D_j$ is done by first computing the residual matrix $$E_j = [e_1, e_2, \ldots, e_N] = Y - \sum_{i \neq j} D_i X_i.$$

Then, by computing the singular value decomposition of the matrix $E_j X_j^T = U \Lambda V^T$, the update of the j-th ortho-basis is done by $D_j = UV^T$. This update rule is obtained by solving a constrained least squares problem with $\|E_j - D_j X_j\|_F^2$ as the penalty term, assuming fixed coefficients $X_j$ and error $E_j$. The constraint is over the feasible matrices $D_j$, which are forced to be orthonormal.

This way the proposed algorithm improves each matrix $D_j$ separately, by replacing the role of the data matrix Y in the residual matrix $E_j$, as the latter should be represented by this updated basis.

Grinbonval suggested a slightly different method. Apart from the fact that here the dictionary is structured, handling a union of orthonormal bases, it updates each orthonormal bases sequentially, and thus reminds the sequential updates done in the K-means. Experimental results show weak performance compared to previous methods. This could partly be explained by the fact that the update of $D_j$ depends strongly on the coefficients $X_j$.

K-Means Algorithm for Vector Quantization (VQ)

In VQ, a codebook C that includes K codewords (representatives) is used to represent a wide family of vectors (signals) $Y=\{y_i\}_{i=1}^N$ ($N \gg K$) by a nearest neighbor assignment. This leads to an efficient compression or description of those signals, as clusters in $\mathbb{R}^n$ surrounding the chosen codewords. Based on the expectation maximization procedure, the K-Means can be extended to suggest a fuzzy assignment and a covariance matrix per each cluster, so that the data is modeled as a mixture of Gaussians.

The dictionary of VQ codewords is typically trained using the K-Means algorithm. We denote the codebook matrix by $C=[c_1, c_2, \ldots, c_K]$, the codewords being the columns. When C is given, each signal is represented as its closest codeword (under $l^2$-norm distance). We can write $y_i = Cx_i$, where $x_i = e_j$ is a vector from the trivial basis, with all zero entries except a one in the j-th position. The index j is selected such that $$\forall_{k \neq j} \|y_i - Ce_j\|_2^2 \leq \|y_i - Ce_k\|_2^2.$$

This is considered as an extreme case of sparse coding in the sense that only one atom is allowed to participate in the construction of $y_i$, and the coefficient is forced to be 1. The representation MSE per $y_i$ is defined as $$e_i^2 = \|y_i - Cx_i\|_2^2. \tag{23}$$

and the overall MSE is $$E = \sum_{i=1}^K e_i^2 = \|Y - CX\|_F^2. \tag{24}$$

The VQ training problem is to find a codebook C that minimizes the error E, subject to the limited structure of X, whose columns must be taken from the trivial basis, $$\min_{C,X} \{\|Y - CX\|_F^2\} \text{ subject to } \forall \, i, \, x_i = e_k \text{ for some } k. \tag{25}$$

The K-Means algorithm is an iterative method used for designing the optimal codebook for VQ. In each iteration there are two stages—one for sparse coding that essentially evaluates X, and one for updating the codebook.

The sparse coding stage assumes a known codebook $C^{(J-1)}$, and computes a feasible X that minimizes the value of (25). Similarly, the dictionary update stage fixes X as known, and seeks an update of C so as to minimize (25). Clearly, at each iteration either a reduction or no change in the MSE is ensured. Furthermore, at each such stage, the minimization step is optimal under the assumptions. As the MSE is bounded from below by zero, and the algorithm ensures a monotonic decrease of the MSE, convergence to at least a local minimum solution is guaranteed. Stopping rules for the above-described algorithm can vary a lot but are quite easy to handle.

SUMMARY OF THE PRIOR ART

Almost all previous methods can essentially be interpreted as generalizations of the K-Means algorithm, and yet, there are marked differences between these procedures. In the quest for a successful dictionary training algorithm, there are several desirable properties:

(i) Flexibility: the algorithm should be able to run with any pursuit algorithm, and this way enable choosing the one adequate for the run-time constraints, or the one planned for future usage in conjunction with the obtained dictionary. Methods that decouple the sparse-coding stage from the dictionary update readily have such a property. Such is the case with the MOD and the MAP based methods.

(ii) Simplicity: much of the appeal of a proposed dictionary training method has to do with how simple it is, and more specifically, how similar it is to K-Means. It is desirable to have an algorithm that may be regarded as a natural generalization of the K-Means. The algorithm should emulate the ease with which the K-Means is explainable and implementable. Again, the MOD seems to have made a substantial progress in this direction, although there is still room for improvement.

(iii) Efficiency: the proposed algorithm should be numerically efficient and exhibit fast convergence. The above described methods are all quite slow. The MOD, which has a second-order update formula, is nearly impractical in reasonable dimensions, because of the matrix inversion step involved. Also, in all the above formulations, the dictionary columns are updated before turning to re-evaluate the coefficients. This approach inflicts a severe limitation on the training speed.

(iv) Well Defined Objective: for a method to succeed, it should have a well defined objective function that measures the quality of the solution obtained. This almost trivial fact was overlooked in some of the preceding work in this field. Hence, even though an algorithm can be designed to greedily improve the representation Mean Square Error (MSE) and the sparsity, it may happen that the algorithm leads to aimless oscillations in terms of a global objective measure of quality.

SUMMARY OF THE INVENTION

It is an object of the present invention to design a dictionary based on learning from training signals, wherein the dictionary yields sparse representations for a set of training signals. These dictionaries have the potential to outperform commonly used pre-determined dictionaries.

The invention thus relate to a novel system and algorithm for adapting dictionaries so as to represent signals sparsely. Given a set of training signals $\{y_i\}_{i=1}^N$, we seek the dictionary D that leads to the best possible representations for each member in this set with strict sparsity constraints. The invention introduces the K-SVD algorithm that addresses the above task, generalizing the K-Means algorithm. The K-SVD is an iterative method that alternates between sparse coding of the examples based on the current dictionary, and an update process for the dictionary atoms so as to better fit the data. The update of the dictionary columns is done jointly with an update of the sparse representation coefficients related to it, resulting in accelerated convergence. The K-SVD algorithm is flexible and can work with any pursuit method, thereby tailoring the dictionary to the application in mind.

The sparse representation problem can be viewed as a generalization of the VQ objective (25), in which we allow each input signal to be represented by a linear combination of codewords, which we now call dictionary elements. Therefore the coefficients vector is now allowed more than one nonzero entry, and these can have arbitrary values. For this case, the minimization corresponding to Equation (25) is that of searching the best possible dictionary for the sparse representation of the example set Y.

$$\min_{D,X}\{\|Y - DX\|_F^2\} \text{ subject to } \forall i, \|x_i\|_0 \leq T_0. \quad (26)$$

A similar objective could alternatively be met by considering $$\min_{D,X} \sum_i \|x_i\|_0 \text{ subject to } \|Y - DX\|_F^2 \leq \epsilon, \quad (27)$$

for a fixed value $\epsilon$. By disclosing the treatment for the first problem (26), any person skilled in the art would immediately realize that the treatment is very similar.

In the algorithm of the invention, we minimize the expression in (26) iteratively. First, we fix D and aim to find the best coefficient matrix X that can be found. As finding the truly optimal X is impossible, we use an approximation pursuit method. Any such algorithm can be used for the calculation of the coefficients, as long as it can supply a solution with a fixed and predetermined number of nonzero entries, $T_0$.

Once the sparse coding task is done, a second stage is performed to search for a better dictionary. This process updates one column at a time, fixing all columns in D except one, $d_k$, and finding a new column $d_k$ and new values for its coefficients that best reduce the MSE. This is markedly different from all the K-Means generalizations. K-Means generalization methods freeze X while finding a better D. The approach of the invention is different, as we change the columns of D sequentially, and allow changing the relevant coefficients. In a sense, this approach is a more direct generalization of the K-Means algorithm, because it updates each column separately, as done in K-Means.

The process of updating only one column of D at a time is a problem having a straightforward solution based on the singular value decomposition (SVD). Furthermore, allowing a change in the coefficients' values while updating the dictionary columns accelerates convergence, since the subsequent columns updates will be based on more relevant coefficients. The overall effect is very much in line with the leap from gradient descent to Gauss-Seidel methods in optimization.

A hypothetical alternative would be to skip the step of sparse coding, and use only updates of columns in D, along with their coefficients, applied in a cyclic fashion, again and again. This however will not work well, as the support of the representations will never be changed, and such an algorithm will necessarily fall into a local minimum trap.

The invention is useful for a variety of applications in signal processing including but not limited to: compression, regularization in inverse problems, feature extraction, denoising, separation of texture and cartoon content in images, signal analysis, signal synthesis, inpainting and restoration.

Typically, all the training signals involved are from the same family and thus have common traits. For examples, the signals can all be pictures, music, speech etc.

BRIEF DESCRIPTION OF THE DRAWINGS

FIGS. 8A-8C show sample compression results for the K-SVD, overcomplete DCT and complete DCT dictionaries, respectively.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

In the present invention, we address the problem of designing dictionaries, and introduce the K-SVD algorithm for this task. We show how this algorithm can be interpreted as a generalization of the K-Means clustering process, and demonstrate its behavior in both synthetic tests and in applications on real data.

The present invention relates to a signal processing method adapted for sparse representation of signals and a system for implementing said method, said system comprising:
  (i) one or more training signals;
  (ii) a dictionary containing signal-atoms;
  (iii) a representation of each training signal using a linear combination of said dictionary's signal-atoms;
  (iv) means for updating the representation of the training signal;
  (v) means for updating the dictionary one group of atoms at a time, wherein each atom update may include all representations referring to said updated atom; and
  (vi) means for iterating (iv) and (v) until a stopping rule is fulfilled.

The training signals are typically from the same family and thus all training signals share common traits and have common behavior patterns. For example, all training signals can be pictures, including pictures of human faces, or the training signals can be sound files including music files, speeches, and the like.

The purpose of the dictionary of the present invention is to discover the common building blocks with which all the training signals can be represented. All the training signals can be represented by linear combinations of the dictionary atoms (building blocks). The term "atom" as referred to herein means dictionary atom or signal-atom.

In some cases, the building blocks or some of the building blocks of the training signals are known or can be approximated intuitively, while in other cases the invention helps to discover them.

According to a preferred embodiment, the dictionary is updated one atom at a time. It is possible however to also update the dictionary a group of atoms at a time, for example two or three atoms at a time, or defining the group of atoms to be updated containing any number of atoms.

In one embodiment of the present invention, the dictionary is an overcomplete dictionary. An overcomplete dictionary contains more atoms (building blocks, functions) than strictly necessary to represent the signal space. An overcomplete dictionary thus allows a suitable representation of a signal with fewer encoded atoms. This is important for applications in which a low bit rate is required.

Signals can be represented in many forms. In one embodiment of the present invention, the representation of each training signal is a coefficient matrix. The representation of the training signals may take any other form such as a vector.

There are many ways to generate a coefficient matrix representing the training signals. In one embodiment of the present invention, the generation of the coefficients matrix is achieved by a pursuit algorithm. The pursuit algorithm can include: Orthogonal Matching Pursuit, Matching Pursuit, Basis Pursuit, FOCUSS or any combination or variation thereof.

Updating the dictionary can be performed sequentially or in any other order. In yet another embodiment of the present invention, the dictionary is updated in a predefined order of the signal-atoms. Depending on the application used and the nature of the training signals, updating the dictionary in a predefined order of signal-atoms will yield different results and thus can be exploited by the application.

In another embodiment of the present invention, only selected signal-atoms of said dictionary are updated. Again, depending on the nature of the application in mind, one may decide to leave certain signal-atoms (building blocks) fixed, and consequently only update the remaining signal-atoms.

In some cases, it may happen that a dictionary is built wherein two signal-atoms are very similar to each other but not equal to each other. The similarity, for the purpose of the application used, may be too big, and thus the differentiation between the two atoms may be considered negligible. The application will thus wish to modify one of the similar atoms. In yet another embodiment of the present invention, a signal-atom is modified when the difference between said signal-atom to another signal atom is below a predefined value.

A signal-atom may be defined by the system as a building block for representing the training signals, but the actual signal-atom may never be used to construct any of the given training signals. One may thus wish to modify this atom. In a further embodiment of the present invention, a signal-atom is modified when it is not used in any representation.

A signal-atom may be found to be used only rarely to construct training signals. It may be thus preferred not to work with such a building block, and modify this atom to one used more frequently in training signals representation. In one embodiment of the present invention, a signal-atom is modified when its usage frequency in the representation of signal-atoms is below a predefined value.

When updating the dictionary, either a single atom or a group of atoms at a time, there are many possibilities to define the best results for the atom values. In yet another embodiment of the present invention, updating the group of atoms and their coefficients best reduces the Mean Square Error (MSE).

In some cases, again depending on the nature of the application used and of the training signals, it may be desired to design dictionaries with one or more custom properties. For example, the dictionary can be shift-invariant. A system is shift-invariant if $f(x-\alpha,y-\beta) \rightarrow g(x-\alpha,y-\beta)$ for arbitrary $\alpha$ and $\beta$. Another embodiment of the invention may design a dictionary with non-negative dictionary values, wherein each atom contains only non-negative entries. Another option is to force zeros in predetermined places in the dictionary. It is possible to design the dictionary with any matrix structure. Multiscale dictionaries or zeros in predefined places are two examples of a structure, but any structure can be used depending on the nature of the training signals and application in mind. A person skilled in the art will easily design other properties in the dictionary according the training signals and the nature of the application. Such custom properties are all considered to be with the scope of the present invention.

In yet another embodiment of the present invention, multiscale dictionaries are built. An image, for example, can be defined using multiscale dictionaries, wherein each dictionary represents the image in a different size. Obviously, a smaller image will show fewer details than a bigger image.

The invention can be used for a variety of applications, including but not limited to: for compression, regularization in inverse problems, feature extraction, denoising, separation of texture and cartoon content in images, signal analysis, signal synthesis, inpainting and restoration.

The K-SVD—Detailed Description

As mentioned previously, the objective function of the K-SVD is $$\min_{D,X}\{\|Y-DX\|_F^2\} \text{ subject to } \forall\, i, \|x_i\|_0 \leq T_0. \tag{28}$$

Let us first consider the sparse coding stage, where we assume that D is fixed, and consider the optimization problem as a search for sparse representations with coefficients summarized in the matrix X. The penalty term can be rewritten as $$\|Y-DX\|_F^2 = \sum_{i=1}^{N}\|y_i - Dx_i\|_2^2.$$

Therefore the problem posed in (28) can be decoupled to N distinct problems of the form $$i = 1, 2, \ldots, N, \min_{x_i}\{\|y_i - Dx_i\|_2^2\} \text{ subject to } \|x_i\|_0 \leq T_0. \tag{29}$$

This problem is adequately addressed by the pursuit algorithms mentioned before, and we have seen that if $T_0$ is small enough, their solution is a good approximation to the ideal one that is numerically infeasible to compute.

We now turn to the second, and slightly more involved process of updating the dictionary together with the nonzero coefficients. Assume that both X and D are fixed, and we put in question only one column in the dictionary, $d_k$, and the coefficients that correspond to it, the i-th row in X, denoted as $x^i_T$ (this is not the vector xi which is the i-th column in X). Returning to the objective function (28), the penalty term can be rewritten as $$\|Y - DX\|_F^2 = \left\|Y - \sum_{j=1}^{K} d_j x_T^j\right\|_F^2 \quad (30)$$

$$= \left\|\left(Y - \sum_{j \neq k} d_j x_T^j\right) - d_k x_T^k\right\|_F^2$$

$$= \|E_k - d_k x_T^k\|_F^2.$$

We have decomposed the multiplication DX to the sum of K rank-1 matrices. Among those, K−1 terms are assumed fixed, and one—the k-th—remains in question. The matrix $E_k$ stands for the error for all the N examples when the k-th atom is removed.

Here, it would be tempting to suggest the use of the SVD (Singular Value Decomposition) to find alternative $d_k$ and $x_T^k$. The SVD finds the closest rank-1 matrix (in Frobenius norm) that approximates $E_k$, and this will effectively minimize the error as defined in (30). However, such a step will be a mistake, because the new vector $x_T^k$ is very likely to be filled, since in such an update of $d_k$ we do not enforce the sparsity constraint.

A remedy to the above problem, however, is simple and also quite intuitive. Define $w_i$ as the group of indices pointing to examples $\{y_i\}$ that use the atom $d_k$, i.e., those where $x_T^k(i)$ is nonzero. Thus, $$\omega_k = \{i | 1 \leq i \leq K \cdot x_T^k(i) \neq 0\}. \quad (31)$$

Define $\Omega_k$ as a matrix of size $N \times |w_k|$, with ones on the $(w_k(i), i)$-th entries, and zeros elsewhere. When multiplying $x_R^k = x_T^k \Omega k$, this shrinks the row vector $x_T^k$ by discarding of the zero entries, resulting with the row vector $x_R^k$ of length $|w_k|$. Similarly, the multiplication $Y_k^R = Y \Omega_k$ creates a matrix of size $n \times |w_k|$ that includes a subset of the examples that are currently using the $d_k$ atom. The same effect happens with $E_k^R = E_k \Omega_k$, implying a selection of error columns that correspond to examples that use the atom $d_k$.

With this notation, we can now return to (30) and suggest minimization with respect to both $d_k$ and $x_T^k$, but this time force the solution of $x_T^k$ to have the same support as the original $x_T^k$. This is equivalent to the minimization of $$\|E_k \Omega_k - d_k x_T^k \Omega_k\|_F^2 = \|E_k^R - d_k x_R^k\|_F^2, \quad (32)$$

and this time it can be done directly via SVD. Taking the restricted matrix $E_k^R$, SVD decomposes it to $E_k^R = U \Delta V^T$. We define the solution for $d_k$ as the first column of U, and the coefficient vector $x_R^k$ as the first column of V multiplied by $\Delta(1, 1)$. In this solution, we necessarily have that (i) the columns of D remain normalized; and (ii) the support of all representations either stays the same or gets smaller by possible nulling of terms.

Figure 1:
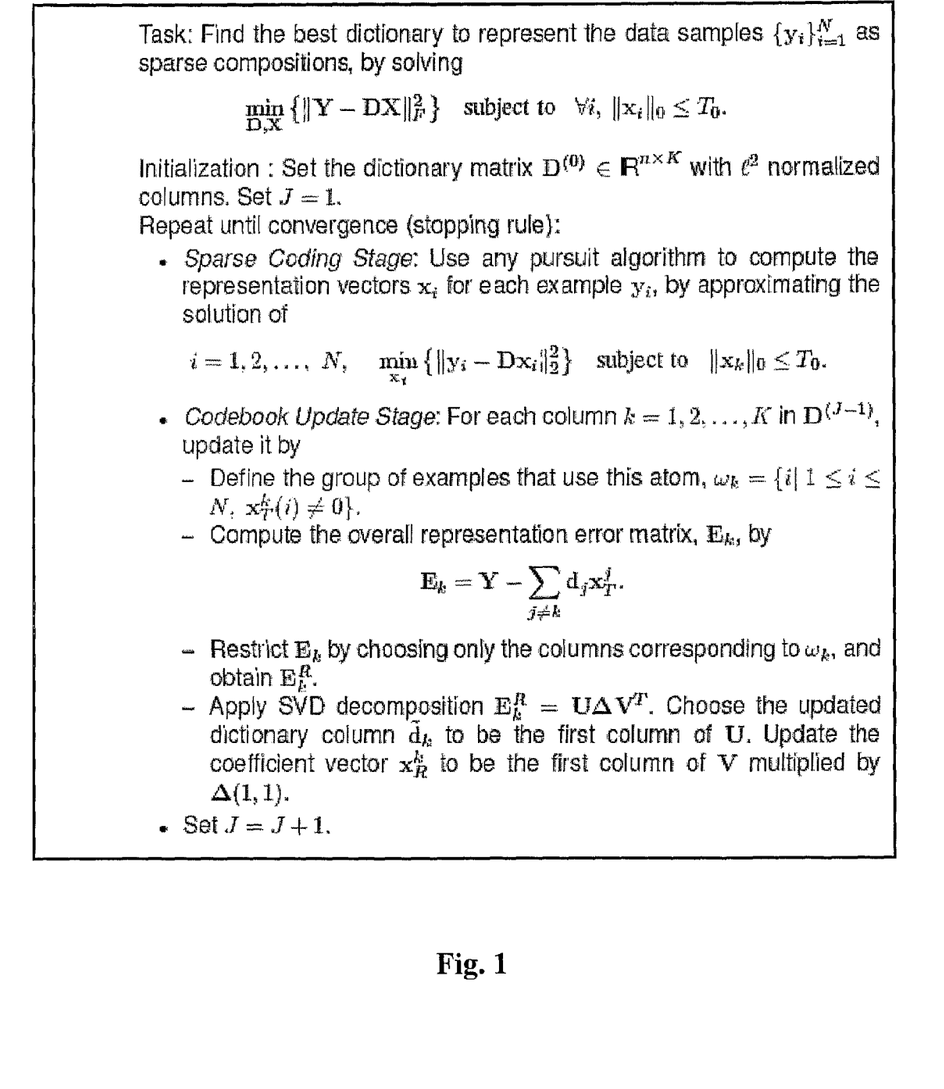
FIG. 1 is a description of the K-SVD algorithm of the invention.

This algorithm has been herein named "K-SVD" to parallel the name K-Means. While K-Means applies K computations of means to update the codebook, the K-SVD obtains the updated dictionary by K SVD computations, each determining one column. A full description of the algorithm is given in FIG. 1.

In the K-SVD algorithm we sweep through the columns and use always the most updated coefficients as they emerge from preceding SVD steps. Parallel versions of this algorithm can also be considered, where all updates of the previous dictionary are done based on the same X. Experiments show that while this version also converges, it yields an inferior solution, and typically requires more than 4 times the number of iterations. These parallel versions and variation are all encompassed by the present invention.

An important question that arises is: Will the K-SVD algorithm converge? Let us first assume we can perform the sparse coding stage perfectly, retrieving the best approximation to the signal $y_i$ that contains no more than $T_0$ nonzero entries. In this case, and assuming a fixed dictionary D, each sparse coding step decreases the total representation error $\|Y-DX\|_F^2$, posed in (28). Moreover, at the update step for $d_k$, an additional reduction or no change in the MSE is guaranteed, while not violating the sparsity constraint. Executing a series of such steps ensures a monotonic MSE reduction, and therefore, convergence to a local minimum is guaranteed.

Unfortunately, the above statement depends on the success of pursuit algorithms to robustly approximate the solution to (29), and thus convergence is not always guaranteed. However, when $T_0$ is small enough relative to n, the OMP, FOCUSS, and BP approximating methods are known to perform very well. While OMP can be naturally used to get a fixed and pre-determined number of non-zeros ($T_0$), both BP and FOCUSS require some slight modifications. For example, in using FOCUSS to lead to $T_0$ non-zeros, the regularization parameter should be adapted while iterating. In those circumstances the convergence is guaranteed. We can ensure convergence by external interference—by comparing the best solution using the already given support to the one proposed by the new run of the pursuit algorithm, and adopting the better one. This way we shall always get an improvement. Practically, we saw in all our experiments that a convergence is reached, and there was no need for such external interference.

From K-SVD Back to K-Means

When the model order $T_0=1$, this case corresponds to the gain-shape VQ, and as such it is important, as the K-SVD becomes a method for its codebook training. When $T_0=1$, the coefficient matrix X has only one nonzero entry per column. Thus, computing the error $E_k^R$ in (32), yields $$E_k^R = E_k \Omega_k = \left(Y - \sum_{j \neq k} d_j x_T^j\right) \Omega_k = Y \Omega_k = Y_k^R. \quad (33)$$

This is because the restriction $\Omega_k$ takes only those columns in $E_k$ that use the $d_k$ atom, and thus, necessarily, they use no other atoms, implying that for all j, $x_T^j \Omega_k = 0$.

The implication of the above outcome is that the SVD in the $T_0=1$ case is done directly on the group of examples in $w_k$. Also, the K updates of the columns of D become independent of each other, implying that a sequential process as before, or a parallel one, both lead to the same algorithm.

We could further constraint our representation stage and beyond the choice $T_0=1$, limit the nonzero entries of X to be 1. This brings us back to the classical clustering problem as described earlier. In this case we have that $x_R^k$ is filled with ones, thus $x_R^k = 1^T$. The K-SVD then needs to approximate the restricted error matrix $E_k^R = Y_k^R$ by a rank-1 matrix $d_k \cdot 1^T$. The solution is the mean of the columns of $Y_k^R$, exactly as K-Means suggests.

K-SVD—Implementation Details

Just like the K-Means, the K-SVD algorithm is susceptible to local minimum traps. Our experiments show that improved results can be reached if the following variations are applied:

(i) When using approximation methods with a fixed number of coefficients, we found out that FOCUSS proves to be the best in terms of getting the best out of each iteration. However, from a run-time point of view, OMP was found to lead to far more efficient overall algorithm.

(ii) When a dictionary element is not being used "enough" (relative to the number of dictionary elements and to the number of samples) it could be replaced with the least represented data element, after being normalized (the representation is measured without the dictionary element that is going to be replaced). Since the number of data elements is much larger than the number of dictionary elements, and since our model assumption suggests that the dictionary atoms are of equal importance, such replacement is very effective in avoiding local minima and over-fitting.

(iii) Similar to the idea of removal of unpopular elements from the dictionary, we found that it is very effective to prune the dictionary from having too-close elements. If indeed such a pair of atoms is found (based on their absolute inner product exceeding some threshold), one of those elements should be removed and replaced with the least-represented signal.

Similarly to the K-Means, we can propose a variety of techniques to further improve the K-SVD algorithm. Appealing examples on this list are multi-scale approaches and tree-based training where the number of columns K is allowed to increase during the algorithm. All these variations, adaptations and improvements are encompassed by the present invention.

Synthetic Experiments

We have first tried the K-SVD algorithm on synthetic signals, to test whether this algorithm recovers the original dictionary that generated the data, and to compare its results with other reported algorithms.

Step 1—generation of the data to train on: A random matrix D (referred to later-on as the generating dictionary) of size 20×50 was generated with iid uniformly distributed entries. Each column was normalized to a unit $l^2$-norm. Then, 1500 data signals $\{y_i\}_{i=1}^{1500}$ of dimension 20 were produced, each created by a linear combination of 3 different generating dictionary atoms, with uniformly distributed iid coefficients in random and independent locations. White Gaussian noise with varying Signal to Noise Ration (SNR) was added to the resulting data signals.

Step 2—applying the K-SVD: The dictionary was initialized with data signals. The coefficients were found using OMP with fixed number of 3 coefficients. The maximum number of iterations was set to 80.

Step 3—comparison to other reported works: we implemented the MOD algorithm, and applied it on the same data, using OMP with fixed number of 3 coefficients, and initializing in the same way. We executed the MOD algorithm for a total number of 80 iterations. We also executed the MAP-based algorithm of Rao and Kreutz-Delgado (Kreutz-Delgado et al., Dictionary learning algorithms for sparse representation. *Neural Computation*. 15(2):349-396, 2003). This algorithm was executed as is, therefore using FOCUSS as its decomposition method. Here, again, a maximum of 80 iterations were allowed.

Figure 2:
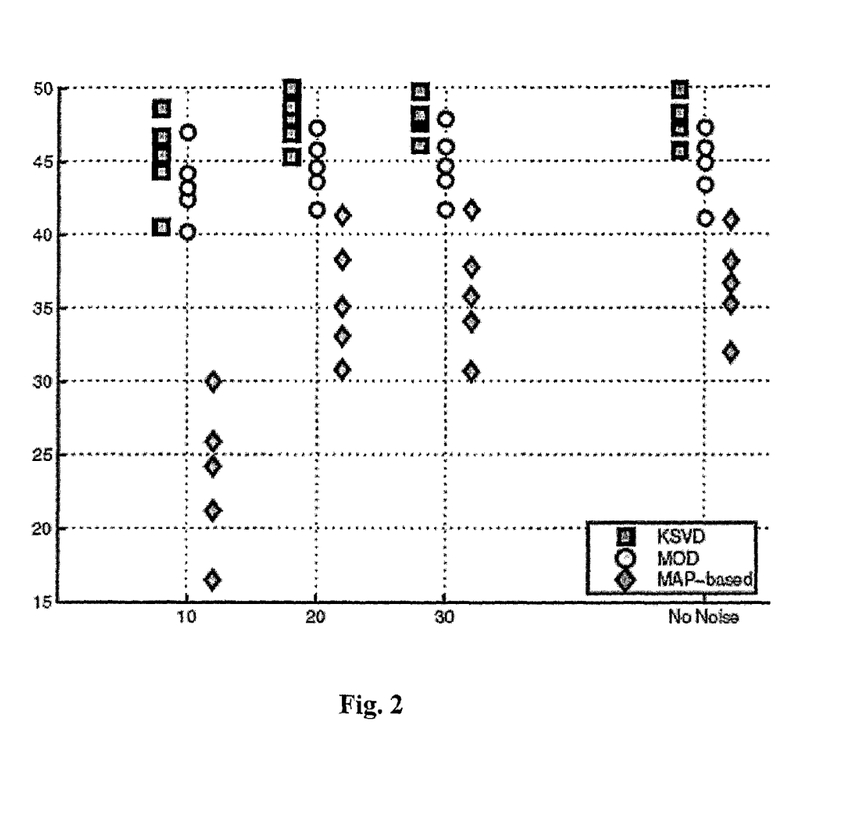
FIG. 2 is graph of synthetic results comparing K-SVD against two known algorithms, MOD and MAP-based algorithms. For each of the tested algorithms and for each noise level, 50 trials were conducted and their results sorted. The graph labels represent the mean number of detected atoms (out of 50) over the ordered tests in groups of 10 experiments.

Results: the computed dictionary was compared against the known generating dictionary. This comparison was done by sweeping through the columns of the generating dictionary, and finding the closest column (in $l^2$ distance) in the computed dictionary, measuring the distance via $$1-|d_i^T \tilde{d}_i|, \quad (34)$$

where $d_i$ is a generating dictionary atom, and $\tilde{d}_i$ is its corresponding element in the recovered dictionary, A distance less than 0.01 was considered a success. All trials were repeated 50 times, and the number of successes in each trial was computed. The results for the three algorithms and for noise levels of 10 dB, 20 dB, 30 dB and ∞ dB (no noise) are displayed in FIG. 2.

We should note that for different dictionary size (e.g., 20×30) and with more executed iterations, the MAP-based algorithm improves and gets closer to the K-SVD detection rates.

Applications to Image Processing

Several experiments have been conducted on natural image data, trying to show the practicality of the algorithm of the invention and the general sparse coding theme. These preliminary tests prove the concept of using such dictionaries with sparse representations.

Figure 3:
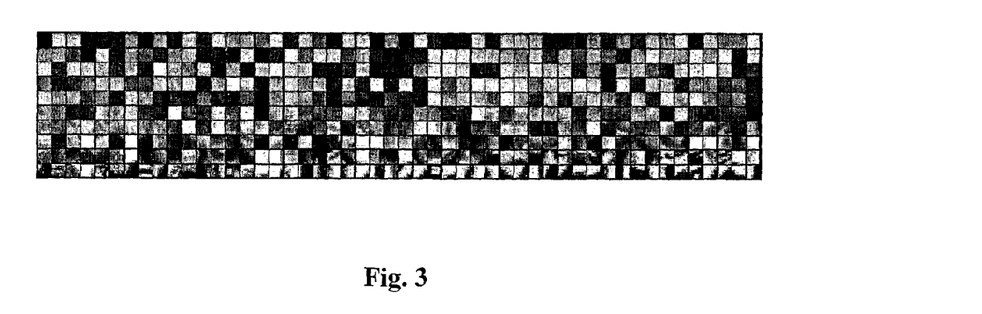
FIG. 3 is a collection of 500 random block patches of size 8×8 pixels, taken from a database of face images, which were used for training with the K-SVD algorithm, sorted by their variance.

Training Data: The training data was constructed as a set of 11,000 examples of block patches of size 8×8 pixels, taken from a database of face images (in various locations). A random collection of 500 such blocks, sorted by their variance, is presented in FIG. 3.

Removal of the DC: Working with real images data we preferred that all dictionary elements except one has a zero mean. For this purpose, the first dictionary element, denoted as the DC, was set to include a constant value in all its entries, and was not changed afterwards. The DC takes part in all representations, and as a result, all other dictionary elements remain with zero mean during all iterations.

Figure 4A:
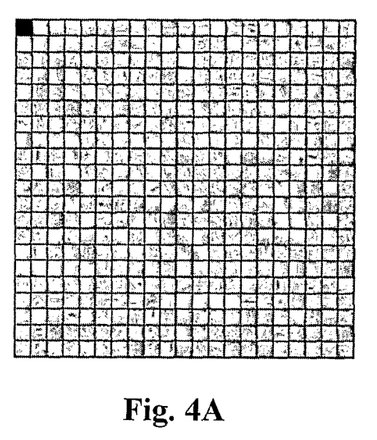
FIG. 4A depicts the learned dictionary (a K-SVD trained dictionary of size 64×441). Its elements are sorted in an ascending order of their variance, and stretched to maximal range for display purposes.

Running the K-SVD: We applied the K-SVD, training a dictionary of size 64×441. The choice K=441 came from our attempt to compare the outcome to the overcomplete Haar dictionary of the same size. The coefficients were computed using the OMP with fixed number of coefficients, where the maximal number of coefficients is 10, A better performance can be obtained by switching to FOCUSS. The test was conducted using OMP because of its simplicity and fast execution. The trained dictionary is presented in FIG. 4A.

Figure 4B:
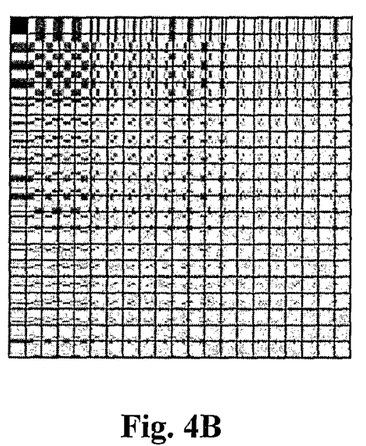
FIGS. 4B and 4C depict the overcomplete separable Haar dictionary and the overcomplete DCT dictionary, respectively, of the same size (shown for comparison).
Figure 4C:
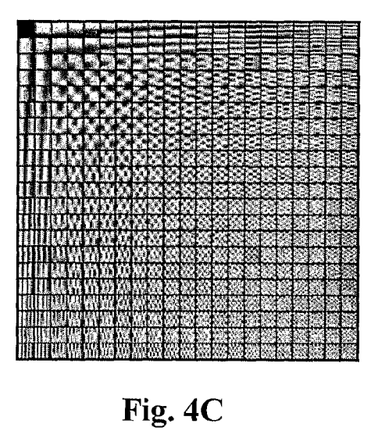

Comparison Dictionaries: The trained dictionary was compared with the overcomplete Haar dictionary which includes separable basis functions, having steps of various sizes and in all locations (total of 441 elements). In addition, we built an overcomplete separable version of the DCT dictionary by sampling the cosine wave in different frequencies to result a total of 441 elements. The overcomplete Haar dictionary is presented in FIG. 4B and the overcomplete DCT dictionary is presented in FIG. 4C.

Applications. The K-SVD results were used, denoted here as the learned dictionary, for two different applications on images. All tests were performed on one face image which was not included in the training set. The first application is filling-in missing pixels: random pixels in the image were deleted, and their values were filled using the various dictionaries decomposition. Then the compression potential of the learned dictionary decomposition was tested, and a rate-distortion graph was presented. These experiments will be described in more detail hereafter.

A. Filling-In Missing Pixels

One random full face image was chosen, which consists of 594 non-overlapping blocks (none of which were used for training). For each block, the following procedure was conducted for r in the range {0.2, 0.9}:

(i) A fraction r of the pixels in each block, in random locations, were deleted (set to zero).

(ii) The coefficients of the corrupted block under the learned dictionary, the overcomplete Haar dictionary, and the overcomplete DCT dictionary were found using OMP with an error bound of $\|0.02 \cdot 1\|_2$, where $1 \in R^n$ is a vector of all ones (the input image is scald to the dynamic range [0, 1]), (allowing an error of ±5 gray-values in 8-bit images). All projections in the OMP algorithm included only the non-corrupted pixels, and for this purpose, the dictionary elements were normalized so that the non-corrupted indices in each dictionary element have a unit norm. The resulting coefficient vector of the block B is denoted $x_B$.

(iii) The reconstructed block $\tilde{B}$ was chosen as $\tilde{B}=D \cdot x_B$.

Figure 5:
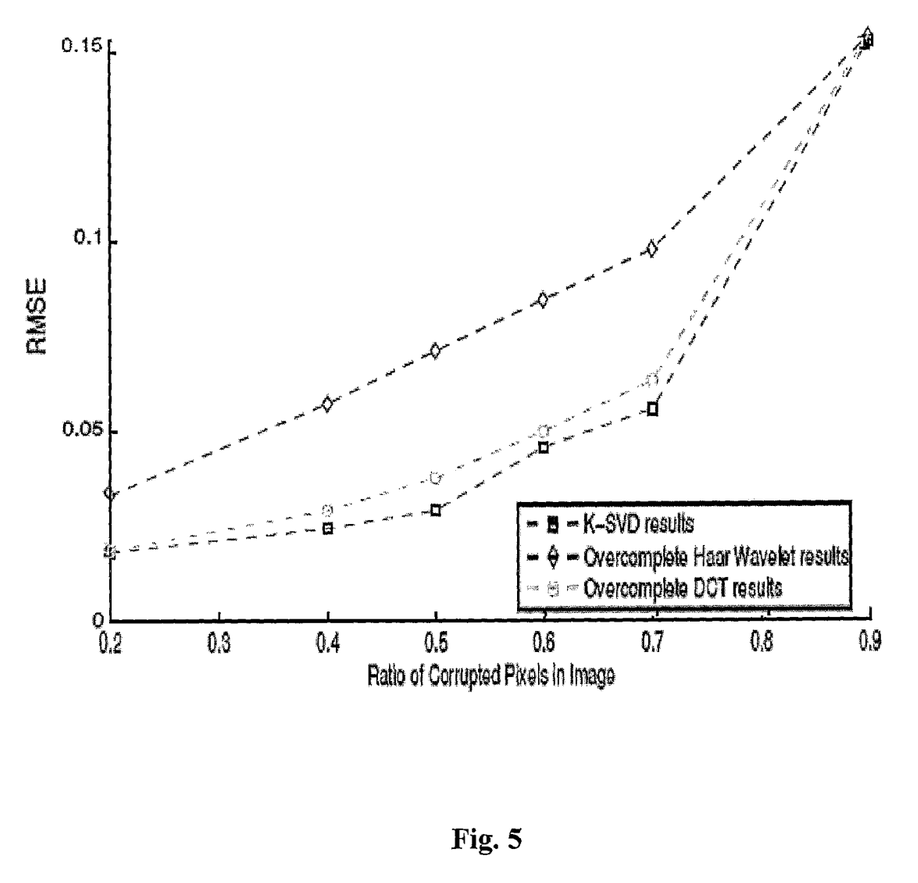
FIG. 5 is the RMSE for 594 new blocks with missing pixels using the learned dictionary of FIG. 4A, the overcomplete Haar dictionary and the overcomplete DCT dictionary.
Figures 6A, 6B:
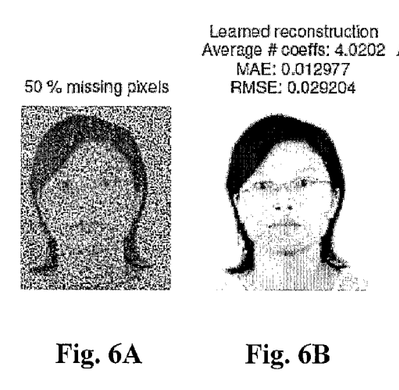
FIGS. 6A-6H compare two corrupted images and their reconstruction, with the missing pixels marked as points (6A, 50% of missing pixels; 6E, 70% of missing pixels), and the reconstructed results by the learned dictionary (6B, 6F), the overcomplete Haar dictionary (6C, 6G), and the overcomplete DCT dictionary (6D, 6H), respectively.
Figure 6C:
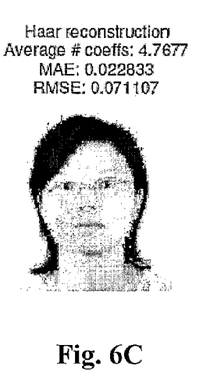
Figure 6D:
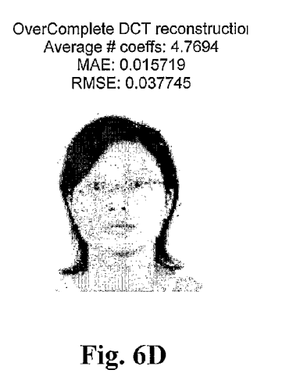
Figure 6E:
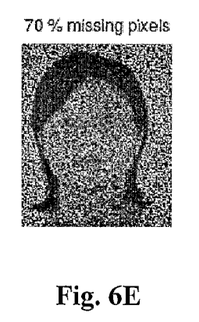
Figure 6F:
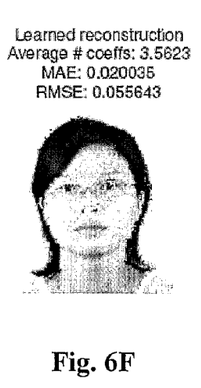
Figure 6G:
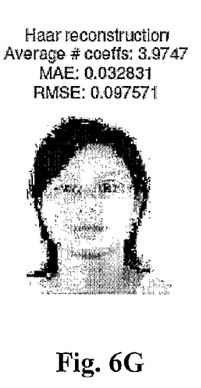
Figure 6H:
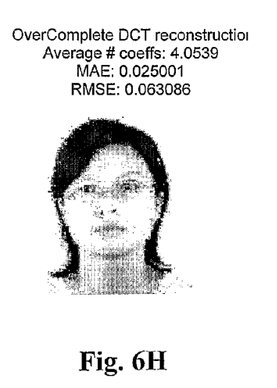

(iv) The reconstruction error was set to: $\sqrt{\|B-\tilde{B}\|_F^2/64}$ (64 is the number of pixels in each block). The mean reconstruction errors (for all blocks and all corruption rates) were computed, and are displayed in FIG. 5. Two corrupted images and their reconstructions can be seen in FIGS. 6A-6H. FIG. 6A shows a face with 50% missing pixels, where FIGS. 6B, 6C and 6D show a learned reconstruction, a Haar reconstruction and a complete DCT reconstruction respectively. FIG. 6E shows a face with 70% missing pixels, where FIGS. 6F, 6G and 6H show a learned reconstruction, a Haar reconstruction and a complete DCT reconstruction respectively. As can be seen, higher quality recovery is obtained using the learned dictionary.

B. Compression

A compression comparison was conducted between the overcomplete learned dictionary, the overcomplete Haar dictionary, and the overcomplete DCT dictionary (as described before), all of size 64×441. In addition, a comparison was made to the regular (unitary) DCT dictionary (used by the JPEG algorithm). The resulted rate-distortion graph is presented in FIG. 7. In this compression test, the face image was partitioned (again) into 594 disjoint 8×8 blocks. All blocks were coded in various rates (bits-per-pixel values), and the Peak Signal-to-Noise Ratio (PSNR) was measured. Let I be the original image and $\tilde{I}$ be the coded image, combined by all the coded blocks. We denote $\epsilon^2$ as the mean squared error between I and $\tilde{I}$, and calculate $$PSNR = 10 \cdot \log_{10}\left(\frac{1}{e^2}\right). \tag{35}$$

In each test we set an error goal $\epsilon$, and fixed the number of bits-per-coefficient Q. For each such pair of parameters, all blocks were coded in order to achieve the desired error goal, and the coefficients were quantized to the desired number of bits (uniform quantization, using upper and lower bounds for each coefficient in each dictionary based on the training set coefficients). For the overcomplete dictionaries, the OMP coding method was used. The rate value was defined as $$R = \frac{a \cdot \# \text{Blocks} + \# coefs \cdot (b+Q)}{\# \text{pixels}}, \tag{36}$$

where a holds the required number of bits to code the number of coefficients for each block.

b holds the required number of bits to code the index of the representing atom. Both a and b values were calculated using an entropy coder.

Blocks is the number of blocks in the image (594).

coefs is the total number of coefficients required to represent the whole image.

pixels is the number of pixels in the image (=64× #Blocks).

In the unitary DCT dictionary the coefficients were picked in a zigzag order, as done by JPEG, until the error bound $\epsilon$ is reached. Therefore, the index of each atom should not be coded, and the rate was defined by, $$R = \frac{a \cdot \# \text{Blocks} + \# coefs \cdot Q}{\# \text{pixels}}, \tag{37}$$

with the same notation as before.

Figure 7:
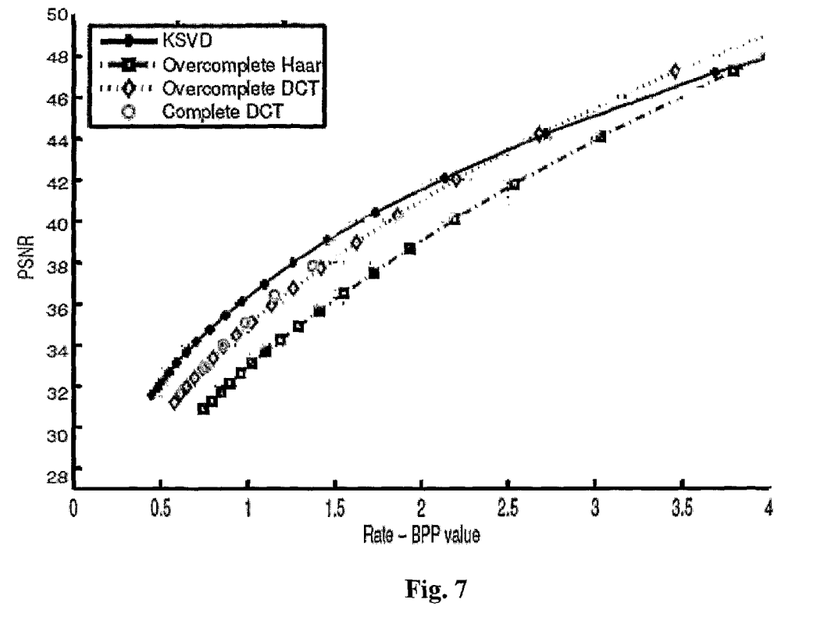
FIG. 7 depicts Rate-Distortion graphs for the compression results for each dictionary.
Figure 8A:
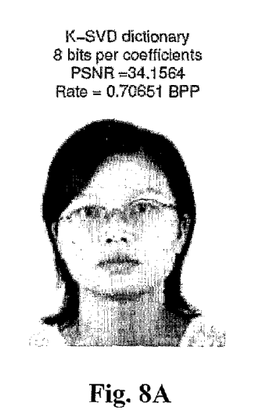
Figure 8B:
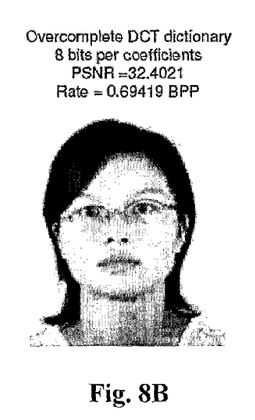
Figure 8C:
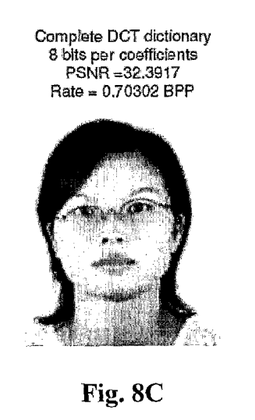

By sweeping through various values of $\epsilon$ and Q we get per each dictionary several curves in the R-D plane. FIG. 7 presents the best obtained R-D curves for each dictionary. As can be seen, the K-SVD dictionary outperforms all other dictionaries, and achieves up to 1-2 dB better for bit rates less than 1.5 bits-per-pixel (where the sparsity model holds true). Samples results are presented in FIGS. 8A-8C. FIG. 8A shows the result using the K-SVD dictionary, while FIGS. 8B and 8C show the results using the overcomplete DCT dictionary and the complete DCT dictionary, respectively.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A computerized signal processing method configured for sparse representation of signals, said method comprising the steps of:
   (i) reading one or more training signals;
   (ii) defining a dictionary containing signal-atoms;
   (iii) creating a representation of each training signal using a linear combination of said dictionary's signal-atoms;
   (iv) updating the representation of the training signal;
   (v) updating the dictionary a single atom or one group of atoms at a time, wherein each atom update includes an update of all representations referring to said updated atom; and
   (vi) iterating (iv) and (v) until a stopping rule is fulfilled.

2. The computerized signal processing method according to claim 1, wherein said group of atoms contains one atom only.

3. The computerized signal processing method according to claim 1, wherein all training signals belong to the same family and have one or more common traits.

4. The computerized signal processing method according to claim 1, wherein said dictionary is an overcomplete dictionary.

5. The computerized signal processing method according to claim 1, wherein the representation of all training signals is a coefficient matrix.

6. The computerized signal processing method according to claim 1, wherein the generation of each coefficients matrix is achieved by a pursuit algorithm.

7. The computerized signal processing method according to claim 6, wherein said pursuit algorithm includes Orthogonal Matching Pursuit, Matching Pursuit, Basis Pursuit, FOCUSS or any combination or variation thereof.

8. The computerized signal processing method according to claim 1, wherein said dictionary is updated in a predefined order of the signal-atoms.

9. The computerized signal processing method according to claim 1, wherein only selected signal-atoms of said dictionary are updated.

10. The computerized signal processing method according to claim 1, wherein a signal-atom is modified when it is not used in any representation.

11. The computerized signal processing method according to claim 10, wherein a signal-atom is modified when the difference between said signal-atom to another signal atom is below a predefined value.

12. The computerized signal processing method according to claim 1, wherein a signal-atom is modified when its usage frequency in the representation of signal-atoms is below a predefined value.

13. The computerized signal processing method according to claim 1, wherein updating said group of atoms and their coefficients best reduces the Mean Square Error.

14. The computerized signal processing method according to claim 1, wherein said dictionary is designed with custom properties.

15. The computerized signal processing method according to claim 14, wherein said custom properties include:
(vii) shift invariant;
(viii) non-negative dictionary values so that each atom contains only non-negative entries;
(ix) zeros in predetermined places; and
(x) any structure of a matrix.

16. The computerized signal processing method according to claim 1, comprising multiscale dictionaries.

17. The computerized signal processing method according to claim 1, for compression, regularization in inverse problems, feature extraction, denoising, separation of texture and cartoon content in images, signal analysis, signal synthesis, inpainting and restoration.

* * * * *